United States Patent [19]

Mitchell

[11] Patent Number: 4,764,560

[45] Date of Patent: Aug. 16, 1988

[54] INTERPENETRATING POLYMERIC NETWORK COMPRISING POLYTETRAFLUOROETHYLENE AND POLYSILOXANE

[75] Inventor: Tyrone D. Mitchell, Albany, N.Y.

[73] Assignee: General Electric Company, Waterford, N.Y.

[21] Appl. No.: 83,885

[22] Filed: Aug. 10, 1987

Related U.S. Application Data

[63] Continuation of Ser. No. 797,575, Nov. 13, 1985, abandoned.

[51] Int. Cl.$^4$ .................. C08L 27/18; C08L 83/06; C08K 3/36; C08K 5/01
[52] U.S. Cl. .................. 524/506; 210/500.42; 55/158; 525/104; 525/903
[58] Field of Search ............... 524/506; 525/104, 903

[56] References Cited

U.S. PATENT DOCUMENTS

| | | | |
|---|---|---|---|
| 2,710,290 | 6/1955 | Safford et al. ............... | 525/104 |
| 2,927,908 | 3/1960 | Kondle et al. ............... | 525/104 |
| 3,207,825 | 9/1965 | Tully ............... | 525/104 |
| 3,865,897 | 2/1975 | Falender et al. ............... | 525/106 |
| 4,010,136 | 3/1977 | Blizzard et al. ............... | 525/104 |
| 4,061,609 | 12/1977 | Bobeas ............... | 525/478 |
| 4,187,390 | 2/1980 | Gore ............... | 428/304 |
| 4,336,364 | 6/1982 | Maxson ............... | 525/478 |
| 4,544,692 | 10/1985 | Kuziemka ............... | 525/104 |
| 4,596,839 | 6/1986 | Peters ............... | 523/175 |

*Primary Examiner*—Wilbert J. Briggs, Sr.
*Attorney, Agent, or Firm*—Gary L. Loser; John W. Harbour

[57] ABSTRACT

There is provided a composition having interpenetrating matrices comprising (a) a first polymer network characterized by nodes interconnected by fibrils and (b) a second polymer network comprising diorganosiloxy units. In another aspect, there are provided compositions comprising an interpenetrating polymer network of polytetrafluoroethylene and polydiorganosiloxane. Methods for making the foregoing compositions are also provided.

21 Claims, No Drawings

INTERPENETRATING POLYMERIC NETWORK COMPRISING POLYTETRAFLUOROETHYLENE AND POLYSILOXANE

This application is a continuation of application Ser. No. 797,575, filed Nov. 13, 1985, now abandoned.

BACKGROUND OF THE INVENTION

The present invention relates to polymeric structures having interpenetrating matrices in cured form, comprising a polytetrafluoroethylene (PTFE) network and a polysiloxane network. More particularly, the present invention relates to interpenetrating polymeric networks wherein a curable silicone composition is mixed with PTFE powder and, thereafter, said silicone is cured while simultaneously stretching the silicone/PTFE mixture.

Tetrafluoroethylene polymers and, in particular, polytetrafluoroethylene, are gaining more and more uses because of their chemical inertness and desirable physical properties such as water repellency and electrical insulating abilities. In one very large area, the field of porous articles, their use has been substantially blocked by the very considerable difficulty of making an article porous and keeping it so while providing it with adequate strength. Complicated and expensive processes have been devised such as adding a filler to the polymer prior to shaping and then removing the filler after shaping, for example, by leaching it out of the shaped article with a solvent, or by melting or burning it out.

Gore, U.S. Pat. Nos. 3,953,566; 3,962,153; 4,096,227; and 4,187,390, overcame the difficulties of the prior art by stretching PTFE rods as fast as possible so as to provide tetrafluoroethylene polymer having outstanding combinations of high porosity and high strength. Moreover, even though the rod was greatly lengthened its diameter remained virtually unchanged throughout its length. The rapid stretching also transformed the hard, shiny rods into a soft, flexible material. Gore also teaches that there may be included as fillers, silicone fluids having structures represented by the formula

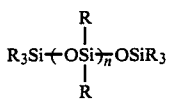

where n is from 0 to about 2000 and R is an alkyl or aryl radical.

Products based on rapidly stretching highly crystalline polytetrafluoroethylene include porous films for filters and laminates; fabric laminates of PTFE film bonded to fabric to produce a material having the contradictory properties of impermeability to liquid water and permeability to water vapor, the material being used to make "breathable" rainwear and filters; porous yarn for weaving and braiding into other products such as pump packing; tubes used as replacements for human arteries and veins; and insulation for high performance electric cables.

An interpenetrating polymer network (IPN) is a combination of at least two polymers in network form, at least one of which is synthesized and/or crosslinked in the immediate presence of the other. IPN's can be further classified as sequential IPN's, where the networks are made sequentially, and simultaneous IPN's, where the monomers are mixed together and polymerized by independent and non-interfering routes. Sequential IPN's can also be prepared by swelling a polymer with a monomer and activating agents and, thereafter, polymerizing the monomer in situ.

Since true IPN's require mixing on the molecular level, which is not possible with some polymers due to their well known thermodynamic incompatibility, those skilled in the art often refer to these IPN's as pseudo-IPN's. For purposes of the present invention the terms "interpenetrating polymer network" and "psuedo-interpenetrating polymer network" are used interchangeably and are intended to describe both sequential IPN's and simultaneous IPN's.

Interpenetrating polymeric networks wherein one of the polymers is a polysiloxane are known in the art. Foscante et al., U.S. Pat. No. 4,250,074, discloses an interpenetrating polymer network of a polymerized epoxy resin network interwined with a polysiloxane network formed by the hydrolytic polycondensation of silane groups. This is achieved by the simultaneous polymerization, at substantially balanced reaction rates, of a mixture of epoxy resin and silane. An amine curing agent forms the epoxy network and water distributed throughout the mixture causes the hydrolytic polycondensation of the silane groups. A preferred method for preparing the IPN is to react epoxy resin with an aminosilane capable of both hydrolytic polycondensation of the silane moiety and amine addition of the oxirane rings of the epoxy resin.

Frisch et al., U.S. Pat. No. 4,302,553, describes interpenetrating polymeric networks characterized by a single glass transition temperature, comprising at least two separate chemically dissimilar macrocyclic structures of crosslinked polymer chains which do not contain ionizable groups and which are crosslinked by different crosslinking agents which crosslink by different crosslinking mechanism, the polymer chains of one macrocyclic structure being threaded through, but having substantially no intermolecular chemical bonding with, another macrocyclic structure of the interpenetrating polymer network, with the proviso that the macrocyclic structures have rings of at least 20 ring atoms. Suitable crosslinking polymers typically can be polyfunctional polyurethane, polyepoxides, polyesters, polyamides, polyimides, phenolics, polysiloxanes, polysulfides, acrylics, poly(styrenebutadiene), poly(styreneacrylonitrile), poly(butadiene-acrylonitrile), polychloroprene, poly(chloroprene-acrylonitrile) and poly(acrylonitrile-butadiene-styrene).

Pierce et al., U.S. Pat. No. 4,312,920, provides a blood contacting layer and a blood contacting interface consisting of a solvent cast polyurethane alloyed with a filler-free silicone rubber. The alloy interface comprises an interpenetrating polymer network consisting of polyurethane and filler-free silicone rubber at the molecular level.

Siegfried et al., U.S. Pat. No. 4,468,499, relates to interpenetrating polymer networks comprised of at least two polymers, the second of which is polymerized in the presence of the first of said polymers, in a mutual solution of said first polymer and a prepolymer or monomer of said second polymer, at least one of said polymers comprising a continuous phase within said composition, said polymers being crosslinked by a non-covalent bonding mechanism selected from the group consisting of (a) ionomeric attraction and (b) block copolymers, each having at least three blocks, at least one of said blocks comprising an elastomeric block and at least two of said blocks comprising physically crosslinked glassy blocks, crystalline blocks or hydrogen bonded blocks, wherein one of said polymers is a triblock copolymer containing monoalkenyl arene polymer end blocks and the other of said polymers is a monoalkenyl arene monomer copolymerized with an acid forming monomer. The crystalline block can be polydiphenylsiloxane and the elastomeric block can be polydimethylsiloxane.

Arkles, U.S. Pat. No. 4,500,688, discloses melt processable compositions comprising a silicone component which is vulcanizable by the reaction of a hydride-containing silicone within a polymeric thermoplastic matrix to form a silicone pseudo-interpenetrating polymer network, said vulcanization of said silicone component being initiated during thermoplastic melt-mixing of said component with said matrix. The polymeric thermoplastic matrices include polyamides, thermoplastic polyurethanes, bisphenol A polycarbonates, styrenics and polyacetals.

All of the foregoing patents are incorporated by reference into the present disclosure.

SUMMARY OF THE INVENTION

It is an object of the present invention to provide interpenetrating polymer networks comprising a polydiorganosiloxane network and a polytetrafluoroethylene network.

It is another object of the present invention to provide porous materials having improved impermeability to liquid water and improved air permeability, e.g., breathability.

Another object of the present invention is to provide materials useful in the manufacture of apparel fabric laminates, geotextiles, geomembranes, filters, and other industrial, medical and electrical applications.

Still another object of the present invention is to provide methods for making polysiloxane-polytetrafluoroethylene interpenetrating networks.

In accordance with the present invention there are provided novel compositions comprising a polysiloxane component vulcanized within a polytetrafluoroethylene component to form an interpenetrating polymer network.

There are also provided methods of producing polysiloxane-polytetrafluoroethylene interpenetrating polymer networks by curing a silicone within the polytetrafluoroethylene matrix, particularly at elevated temperatures while simultaneously stretching a mixture of said silicone and polytetraflouroethylene.

DESCRIPTION OF THE INVENTION

In accordance with one aspect of the present invention there are provided compositions having interpenetrating matrices in cured form, comprising:
(a) a first polymer network characterized by nodes interconnected by fibrils, and
(b) a second polymer network comprising diorganosiloxy units.

Component (a) can be any polymer capable of being stretched, drawn or expanded so as to obtain a microstructure characterized by nodes interconnected by very small fibrils. It is especially preferred that component (a) be polytetrafluoroethylene as taught by Gore in the aforementioned U.S. patents. Polyethylene, polyamides, and polyesters are also known to exhibit a fibrillar structure upon being drawn or expanded. The suitability of other polymers for practicing the present invention will be obvious to those skilled in the art or can be ascertained without undue experimentation.

Component (b) can be any curable silicone composition, however, it is preferred that an addition curable silicone composition be employed in the practice of the invention. Generally stated, addition curable silicone compositions comprise (1) a polydiorganosiloxane having alkenyl unsaturation, (2) an organohydrogenpolysiloxane crosslinking agent, and (3) a catalyst for promoting crosslinking of (1) and (2). The principles of this chemistry are well known to those skilled in the art.

Alkenyl-containing polydiorganosiloxanes typically employed in the practice of the present invention can have viscosities up to 100,000,000 centipoise or more at 25° C., for example, in accordance with the teaching of U.S. Pat. No. 4,061,609 to Bobear. It has been found that excellent results are obtained when the viscosity of the alkenyl-containing polysiloxane is from about 500 centipose to 50,000 centipoise at 25° C., and especially when the viscosity is from about 3000 centipoise to 6000 centipoise at 25° C.

Organohydrogenpolysiloxanes that can be utilized in the present invention may be linear or resinous and have viscosities of between about 25 centipoise and 10,000 centipoise at 25° C., with the preferred range being from about 100 centipoise to about 1000 centipoise at 25° C.

The curing catalyst can be either an organic peroxide or a precious metal containing material. Suitable organic peroxides include dibenzoyl peroxide, bis-2,4-dichlorobenzoyl peroxide, di-t-butyl peroxide, 2,5-dimethyl-2,5-di-(t-butylperoxy) hexane, and dicumyl peroxide. Precious metal containing catalysts can be used on the metals rhodium, ruthenium, palladium, osmium, irridium and platinum. It is particularly preferred that a platinum metal complex be employed as the catalyst, for example, as taught by Ashby in U.S. Pat. Nos. 3,159,601 and 3,159,662, Lamoreaux in U.S. Pat. No. 3,220,970, Karstedt in U.S. Pat. No. 3,814,730, and Modic in U.S. Pat. No. 3,516,946.

In an especially preferred embodiment, the addition curable silicone composition further includes a reinforcing organopolysiloxane resin of the type disclosed in U.S. Pat. No. 3,284,406 to Nelson or U.S. Pat. No. 3,436,366 to Modic. Briefly, such resins are copolymers of $SiO_2$ units, $(CH_3)_3SiO_{0.5}$ units and $(CH_3)_2(CH_2=CH)SiO_{0.5}$ units, and $SiO_2$ units, $(CH_3)_3SiO_{0.5}$ units and $(CH_3)(CH_2=CH)SiO$ units, respectively. Particularly preferred organopolysiloxane resins are MDQ resins having vinyl unsaturation on monofunctional siloxane units, difunctional siloxane units, or both. The use of such reinforcing organopolysiloxane resins is especially desirable when the viscosity of the alkenyl containing polydiorganosiloxane is less than about 5000 centipoise at 25° C.

It is also contemplated that there may be included any conventional extending and/or reinforcing fillers. Fumed silica has been found to be particularly effective as a reinforcing filler for the silicone component of the present invention.

On another particularly preferred embodiment of the present invention, the addition curable silicone composition also contains a silane or polysiloxane which functions both as an inhibitor and as an adhesion promoter. One such composition is described in U.S. Pat. No. 3,759,968 to Berger et al. as a maleate or fumarate functional silane or polysiloxane. Compositions effective only as an inhibitor are disclosed in U.S. Pat. No. 4,256,870 to Eckberg and 4,061,609 to Bobear. Other suitable inhibitors will be obvious to those skilled in the art.

It is further contemplated that component (b) can be condensation curable silicone composition. Generally, condensation curable silicone compositions are available in either one or two packages and comprise (1) a polydiorganosiloxane having terminal hydrolyzable groups, e.g., hydroxyl or alkoxyl, and (2) a catalyst which promotes condensation curing. Such compositions are well known in the art, for example, as described in U.S. Pat. No. 3,888,815 to Bessmer et al.

Alternatively, the polysiloxane network can be prepared by the hydrolytic polycondensation of silanes having the general formula

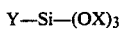

$$Y-Si-(OX)_3$$

where each X is independently selected from the group consisting of hydrogen, alkyl radicals, hydroxyalkyl radicals, alkoxyalkyl radicals, and hydroxyalkoxyalkyl radicals, and Y is an alkyl radical, OX, where X is as previously defined, or an amino or substituted amino radical. The use of silanes having hydrolyzable groups to form a polysiloxane network of an interpenetrating polymer network is discussed in greater detail in U.S. Pat. No. 4,250,074 to Foscante et al.

The amount of curable silicone composition used in practicing the present invention can range from as little as about 1 part by weight per 100 parts by weight of component (a) to as much as about 150 parts by weight per 100 parts by weight of component (a). A particularly preferred embodiment of the present invention utilizes from 1 to 50 parts by weight silicone per 100 parts by weight of component (a). Optimal results are obtained when from about 5 to about 35 parts by weight of silicone composition are used per 100 parts by weight of polytetrafluoroethylene. It should be noted that the translucency of the final product increases as the ratio of silicone composition to PTFE increases.

For ease of discussion, preparation of compositions having interpenetrating matrices in cured form will be described only with respect to polytetrafluoroethylene and addition curable silicone compositions. Those skilled in the art will appreciate that in order to prevent premature curing of the silicone composition the components must not all be combined until the time of use unless a suitable inhibitor is included (or moisture excluded in the case of condensation curable silicone compositions).

In a preferred embodiment of this invention a one component, addition curable silicone composition containing an amount of inhibitor effective to prevent curing below about 100° C. is dissolved in a suitable solvent, for example, kerosene or mineral spirits. The resulting solution is thereafter mixed with the polytetrafluoroethylene powder in a tumbler-type mixer suitable for mixing liquids with solids in order to incorporate the desired level of silicone into the PTFE. The semi-dry powder obtained is a mixture of PTFE, silicone composition and solvent which can be pressed into a cylindrical bar or other suitable shape.

The cylindrical bar is then extruded and calendered to provide a film of desired thickness. After the solvent is removed the film can be stretched to provide a film having a porous microstructure consisting of nodes and fibrils. Although expansion of the film can be carried out at temperatures ranging from room temperature to about 325° C., it is preferable that the temperature range from about 250° C. to about 300° C. so that the silicone composition cures during the stretching process.

If an inhibitor is not present to prevent premature curing of the silicone composition, it is desirable to prepare a mixture of PTFE and vinyl containing polydiorganosiloxane and a mixture of PTFE and organohydrogenpolysiloxane, either or both mixtures also containing a curing catalyst. At the time of use the powders are combined and the final product prepared as if an inhibitor were present.

Because of the presence of the silicone in the extruded PTFE film, stretching was easier as the silicone acted as an internal plasticizer. Consequently, it is not required that stretching be effected as fast as possible, and excellent results have been obtained with stretch rates of only 20% per second. Of course, that does not preclude stretching at rates of 1000% per second or more as taught by Gore in U.S. Pat. No. 3,953,566.

Stretched films prepared in accordance with the present invention generally have thicknesses ranging from about 0.5 mils to about 10 mils. Quite surprisingly, however, the resultant materials had larger pore sizes than similar materials prepared solely from PTFE, yet they exhibit improved air permeability and improved resistance to liquid water permeability.

It is also preferred that the expanded products be heated to above the lowest crystalline melting point of the PTFE so as to increase the amorphous content of the polymer, typically to 10% or more. Such amorphous regions within the crystalline structure appear to greatly inhibit slippage along the crystalline axis and thereby lock fibrils and nodes so that they resist slippage under stress. As a result, a surprising increase in strength is obtained.

In another aspect to the present invention there are provided compositions having interpenetrating matrices in cured form comprising:

(a) a first polymer network comprising polytetrafluoroethylene, and (b) a second polymer network comprising polydiorganosiloxane.

Components (a) and (b) of this aspect of the invention are the same as described hereinabove, however, the final product is prepared by conventional extrusion techniques rather than by stretching.

Compositions prepared in accordance with the present invention find particular utility as filters, pump packing, insulation for electrical cables, and as laminates useful in the manufacture of breathable wearing apparel.

In order to better enable those skilled in the art to practice the present invention, the following examples are provided by way of illustration and not by way of limitation. All parts and percentages are by weight unless otherwise noted.

EXAMPLES

Silicone compositions comprising the components set forth in Table 1 were prepared and identified as silicone A through silicone J.

TABLE 1

Silicone Compositions Evaluated as Additives to Polytetrafluoroethylene

Experimental Formulations Evaluated with Polytetrafluoroethylene (PTFE) (% Composition)

| Ingredients | A | B | C | D | E | F | G | H | I | J |
|---|---|---|---|---|---|---|---|---|---|---|
| ViSiMe$_2$O[SiMe$_2$O]$_x$SiMe$_2$Vi (3,500 cps) | 68.2 | 75 | — | — | — | — | 54.5 | — | — | — |
| ViSiMe$_2$O[SiMe$_2$O]$_x$SiMe$_2$Vi (50,000 cps) | — | — | — | — | — | — | — | 14.2 | 23.7 | 47.4 |
| MQD' Resin (M = Me$_3$SiO$_{\frac{1}{2}}$, Q = SiO$_{4/2}$, D$^1$ = MeViSiO$_{2/2}$) | 22.7 | 25 | — | — | — | — | 36.4 | — | — | — |
| M"Q Resin (M" = Me$_2$HSiO$_{\frac{1}{2}}$) + M'D$_x$M' (M' = Me$_2$ViSiO) (50:50) | 8.2 | — | 100 | — | — | — | 8.2 | 0.64 | 1.1 | 2.2 |
| Bis(trimethoxysilylpropyl)maleate | 0.9 | — | — | — | — | — | 0.9 | 0.15 | 0.25 | 0.5 |
| Me$_3$SiO[SiMe$_2$O]$_x$SiMe$_3$ (1,000 cps) | — | — | — | 100 | — | — | — | — | — | — |
| HOSiMe$_2$O[SiMe$_2$O]$_x$SiMe$_2$OH (3,000 cps) | — | — | — | — | 100 | — | — | — | — | — |
| MeSi(OMe$_2$)O[SiMe$_2$O]$_x$Si(OMe)$_2$Me (3,500 cps) | — | — | — | — | — | 100 | — | — | — | — |
| Toluene | — | — | — | — | — | — | — | 85 | 75 | 50 |
| Platinum Catalyst (Lamoreaux) | 10 ppm | 10 ppm | — | — | — | — | 10 ppm | 1.0 ppm | 1.0 ppm | 1.0 ppm |

Silicone-PTFE compositions were then prepared by dissolving the silicone in kerosene and then mixing this solution with PTFE in a tumbler-type mixer. These compositions are set forth in Table 2 as compositions 1 through 10.

TABLE 2

Silicone - PTFE Compositions

| Composition Number | % Kerosene[1] | % Silicone[2] | Weight Kerosene, lbs. | Weight Silicone, lbs. | Weight PTFE, lbs. | Weight CaCO$_3$, lbs. |
|---|---|---|---|---|---|---|
| 1 | 17 | 7 | 11 | 4.5 | 60 | — |
| 2 | 17 | 7 | 1.2 | 0.5 | 6.5 | — |
| 3 | 17 | 7 | 1.2 | 0.5 | 6.5 | — |
| 4 | 17 | 7 | 1.2 | 0.5 | 6.5 | — |
| 5 | 17 | 7 | 1.2 | 0.5 | 6.5 | — |
| 6 | 17 | 7 | 1.2 | 0.5 | 6.5 | — |
| 7 | 17 | 20 | 1.2 | 1.4 | 5.6 | — |
| 8 | 17 | 7 | 1.2 | 0.5 | 6.2 | 0.35 |
| 9 | 17 | 7 | 1.2 | 0.5 | 6.5 | — |
| 10 | 13 | 20 | 1.2 | 1.4 | 5.6 | — |

[1]Kerosene calculated as percent of total solids weight.
[2]Silicone level based on percent of final "dried", extruded film.

Extrusions of the foregoing silicone-PTFE compositions were prepared as specified in Table 3.

TABLE 3

PTFE - Silicone Extrudates

| Extruded Sample[1] No. | Silicone Used (%) | Stretch Ratio | Specific[2] Gravity | Final Width, ins. |
|---|---|---|---|---|
| 1A | A (7) | 1:1 | 1.63 | 6.4 |
| 1B | A (7) | 1:2 | 1.09 | 5.9 |
| 1C | A (7) | 1:3 | 0.87 | 5.4 |
| 1D | A (7) | 1:4 | 0.77 | 4.9 |
| 2 | D (7) | 1:1 | 1.23 | 5.5 |
| 3 | E (7) | 1:1 | 1.29 | 6.0 |
| 4 | F (7) | 1:1 | 1.38 | 5.75 |
| 5 | B (7) | 1:1 | 1.32 | 6.0 |
| 6A | B + C (7) | 1:1 | — | 5.75 |
| 6B | B + C (7) | 1:3 | 1.41 | 5.75 |
| 7 | A (20) | 1:1 | 1.75 | 4.0 |
| 8 | A (7, 5% CaCO$_3$) | 1:1 | 1.70 | 6.0 |
| 9 | G (7) | 1:1 | 1.66 | 6.75 |
| 6C[3] | B + C (7) | 1:1 | 1.95 | 6.0 |
| 10 | G (20) | 1:1 | — | — |

[1]All samples used 17% kerosene as a lubricant except 10 which used 13% resulting in a more difficult extrusion.
[2]The reduction in specific gravity for 1A–1D reflects the difference in longitudinal stretching of the samples.
[3]Extrudable PTFE-Silicone mixture stored at 72° F. for 22 hours before extrusion.

The extruded, calendered and dried PTFE-silicone samples were then stretched from their extruded width of about six inches to 64, 66 or 74 inches. The films were sintered during the stretching operation to prevent shrinking. Moreover, since sintering was effected at 300° C., the crosslinkable silicone mixtures were crosslinked during this operation. Physical properties of the stretched film are shown in Table 4 where data on permeability of the stretched films with different silicone additives are compared.

TABLE 4

Physical Properties and Permeability Data for Stretched PTFE-Silicone and PTFE Film

| Sample Number | Stretch Ratio | Initial Width, in. | Final Film Width, in. | Film Thickness, mils | Specific Gravity | Mullen Value, psi | Bubble Point, psi | Maximum Pore Size, microns | Air Permeability Cu Ft/mm/Pt$^2$ | Moisture-Vapor Transmission g/m$^2$/24 hr |
|---|---|---|---|---|---|---|---|---|---|---|
| 1A | 1:1 | 4.5 | 74 | 1.4 | 0.49 | 26 | 4.0 | 0.809 | 1.0 | 794 |
| 1A | 1:1 | 4.5 | 66 | 0.8 | 0.57 | 18 | 2.0 | 1.62 | 3.0 | 873 |
| 1B | 1:2 | 4.0 | 64 | 0.3 | 1.02 | 49 | 8.0 | 0.404 | 2.0 | 552 |

TABLE 4-continued

Physical Properties and Permeability Data for Stretched PTFE-Silicone and PTFE Film

| Sample Number | Stretch Ratio | Initial Width, in. | Final Film Width, in. | Film Thickness, mils | Specific Gravity | Mullen Value, psi | Bubble Point, psi | Maximum Pore Size, microns | Air Permeability Cu Ft/mm/Pt$^2$ | Moisture-Vapor Transmission g/m$^2$/24 hr |
|---|---|---|---|---|---|---|---|---|---|---|
| 1B | 1:2 | 4.0 | 74 | 0.4 | 0.75 | 59 | 7.0 | 0.462 | 2.0 | 851 |
| 1C | 1:3 | 3.5 | 74 | 0.2 | 0.96 | 93 | 12.0 | 0.270 | 3.0 | 845 |
| 1D | 1:4 | 3.5 | 74 | 0.2 | 0.96 | 65 | 11.0 | 0.294 | 2.5 | 814 |
| 2 | 1:1 | 3.5 | 74 | 0.4 | 0.69 | 26 | 5.0 | 0.647 | 4.0 | 807 |
| 3 | 1:1 | 4.0 | 74 | 1.0 | 0.53 | 23 | 3.0 | 1.08 | 3.5 | 867 |
| 4 | 1:1 | 4.25 | 64 | 1.3 | 0.50 | 25 | 5.0 | 0.647 | 2.0 | 662 |
| 5 | 1:1 | 4.0 | 64 | 2.1 | 0.36 | 25 | 5.0 | 0.647 | 1.5 | 690 |
| 5 | 1:1 | 4.0 | 74 | 1.0 | 0.53 | 33 | 5.0 | 0.647 | 2.0 | 830 |
| 6A | 1:1 | 4.25 | 64 | — | — | — | — | — | — | — |
| 6B | 1:3 | 4.25 | 64 | — | — | — | — | — | — | — |
| 7 | 1:1 | 3.25 | 64 | — | — | — | — | — | — | — |
| 8 | 1:1 | 4.0 | 64 | — | — | — | — | — | — | — |
| 9 | 1:1 | 4.5 | 64 | 2.6 | 0.35 | 16 | 3.5 | 0.901 | 2.0 | 745 |
| PTFE | 1:1 | 4.5 | 74 | 1.5 | 0.4 | 35 | 7.0 | 0.50 | 1.5 | 900 |
| PTFE | 1:2 | 4.5 | 74 | 1.5 | 0.35 | 20 | 15.0 | 0.20 | 1.0 | 900 |

In Table 4 the stretched film property measurements have the following meanings:

Stretch Ratio—Since the extrudate is conveyed over heated drum-rollers during the drying step, longitudinally stretching of the film can be varied by adjusting the speed of the drums. A ratio of 1:1 assumes that no stretching occurs in the machine direction.

Mullen Value—Measures the pounds per square inch of water pressure needed to get penetration of the film.

A detailed set of extraction experiments were then conducted to show that the silicone compositions did cure into the PTFE matrix. Also included in the extraction study were silicones which could not be crosslinked. Thus, weight loss studies before and after extraction with hexane in a Sohxlet extraction apparatus show whether an interpenetrating network was formed. The data were collected for both extruded and stretched samples and the results as set forth in Table 5.

TABLE 5

Extraction and Elemental Analysis Results for Extruded and Stretched PTFE-Silicone Compositions

| Sample Number | Type of PTFE-Silicone Film | Heat Treatment | % Silicone (Theory) | % Silicone (Extracted) | % Si (Theory) | % Si (Calculated) | % Si (Found) |
|---|---|---|---|---|---|---|---|
| 1A | Extruded | None | 7.0 | 1.01 | 2.65 | 2.27 | 2.57 |
| 1A | Extruded | 200° C., 1 hr | 7.0 | 0.630 | 2.65 | 2.41 | 2.65 |
| 1A | Stretched | Sintered, ~300° C. | 7.0 | 0.523 | 2.65 | 2.45 | 2.82 |
| 7 | Extruded | None | 20.0 | 1.34 | 7.57 | 7.06 | 6.20 |
| 7 | Extruded | None | 20.0 | 2.275 | 7.57 | 6.71 | 6.42 |
| 7 | Extruded | 200° C., 1 hr | 20.0 | 0.41 | 7.57 | 7.41 | 6.72 |
| 8 | Extruded | None | 7.0 | 1.375 | 2.65 | 2.13 | 2.09 |
| 5 | Extruded | 200° C., 1 hr | 7.0 | 7.01 | 2.65 | 0 | 0.51 |
| 6A | Extruded | None | 7.0 | 0.78 | 2.65 | 2.35 | 2.58 |
| 9 | Extruded | None | 7.0 | 0.736 | 2.65 | 2.37 | 2.47 |
| 9 | Extruded | 200° C., 1 hr | 7.0 | 0.90 | 2.65 | 2.31 | 3.73 |
| 2 | Extruded | None | 7.0 | 6.97 | 2.65 | 0.011 | 0.35 |
| 3 | Extruded | None | 7.0 | 7.03 | 2.65 | 0 | 0.36 |
| 3 | Stretched | Sintered, ~300° C. | 7.0 | 6.23 | 2.65 | 0.257 | 1.37 |
| 4 | Extruded | None | 7.0 | 2.77 | 2.65 | 1.60 | 1.72 |

A measure of waterproofness. The higher the Mullen value the more waterproof is the film. A minimum value of 25 is desired.

Bubble Point—A measure of the pounds per square inch of pressure necessary to produce a bubble in a column of water on the opposite side of the film. This is a measure of the porosity from which the maximum pore size can be calculated.

Air Permeability—Measures the breatheability of the film by the air flow through the membrane expressed in cubic feet per minute per square foot of area.

Moisture-Vapor Transmission (MVT)—This also measures the breatheability of the film by the number of grams of water evaporated per square meter of area over a 24 hour period when air flows across a film in contact with water on the opposite side. A higher the value the greater the breatheability.

The results in Table 4 show that excellent results are obtained in comparison to stretched PTFE which does not have an interpenetrating polydiorganosiloxane network.

In Table 5, the theoretical weight percent silicone is that amount mixed with PTFE, while the percent silicone extracted is the actual weight loss from the sample after extraction. From these two values percent silicon for the amount originally added (% Si theory) and percent silicon for the amount remaining after extraction (% Si calculated) were determined. These results were then compared with the percent silicon found by elemental analysis (% Si found). For sample 5, which contained an uncrosslinkable silicone, essentially all of the silicone was extracted, even after thermal treatment.

A comparison of the stretched PTFE-silicone films shows that for the 1A sample essentially none of the silicone could be extracted, whereas for sample 3 most of the silicone was extracted as expected.

Sample 4 showed less extractable silicone than was expected, suggesting that crosslinking occurred through interaction of the material with atmospheric moisture or moisture introduced during processing, since this was a condensation curable silicone.

Next, an extruded sample of PTFE having a 50 mil thickness and containing 20 percent of Silicone G (Table 1) was cured at 200° C. for two hours. The resultant material had a Shore A hardness of 90, 484 psi tensile at break and 183% elongation. In addition to being elastomeric, the material was substantially translucent.

I claim:

1. A composition having a porous microstructure of interpenetrating matrices, comprising:
   (a) a polytetrafluoroethylene polymer network characterized by nodes interconnected by fibrils, and
   (b) a second polymer network consisting essentially of diorganosiloxy units
wherein the weight ratio of component (b) to component (a) is from 1:100 to about 20:80.

2. A composition as in claims 1 wherein components (b) is formed from an addition curable silicone composition comprising (1) a polydiorganosiloxane having alkenyl unsaturation, (2) an organohydrogenpolysiloxane crosslinking agent, and (3) a catalyst for promoting crosslinking of (1) and (2).

3. A composition as in claim 2, wherein the viscosity of the polydiorganosiloxane having alkenyl unsaturation is less than 100,000,000 centipoise at 25° C.

4. A composition as in claim 2, wherein the viscosity of the polydiorganosiloxane having alkenyl unsaturation is from about 500 centipoise to about 50,000 centipoise at 25° C.

5. A composition as in claim 2, wherein the viscosity of the polydiorganosiloxane having alkenyl unsaturation is from about 3000 centipoise to about 6000 centipoise at 25° C.

6. A composition as in claim 3, wherein the organohydrogenpolysiloxane has a viscosity of from about 25 centipoise to about 10,000 centipoise at 25° C.

7. A composition as in claim 4, wherein the organohydrogenpolysiloxane has a viscosity of from about 100 centipoise to about 1000 centipoise at 25° C.

8. A composition as in claim 7, wherein the organohydrogenpolysiloxane is substantially linear.

9. A composition as in claim 7, wherein the organohydrogenpolysiloxane is a resin.

10. A composition as in claim 6, wherein the curing catalyst is a platinum containing complex.

11. A composition as in claim 10, further comprising a reinforcing organopolysiloxane resin.

12. A composition as in claim 11, wherein the reinforcing organopolysiloxane resin has vinyl unsaturation on monofunctional siloxane units, difunctional siloxane units, or both.

13. A composition as in claim 6, further comprising a filler.

14. A composition as in claim 13, wherein the filler is fumed silica.

15. A composition as in claim 6, further comprising a cure inhibitor.

16. A composition as in claim 15, wherein the cure inhibitor is a maleate or fumarate functional silane or polysiloxane.

17. A composition as in claim 1 wherein component (b) is formed from a condensation curable silicone composition.

18. A composition having a porous microstructure of interpenetrating matrices, comprising:
   (a) a first polymer network characterized by nodes interconnected by fibrils comprising polytetrafluoroethylene, and
   (b) a second polymer network comprising polydiorganosiloxane,
wherein the weight ratio of component (b) to component (a) is from 1:100 to about 7:93.

19. A composition as in claim 18, wherein the polydiorganosiloxane is formed from an addition curable silicone composition.

20. A composition as in claim 18, wherein the polydiorganosiloxane is formed from a condensation curable silicone composition.

21. A composition having a porous microstructure of interpenetrating matrices, comprising:
   (a) a first polymer network characterized by nodes interconnected by fibrils comprising polytetrafluoroethylene, and
   (b) a second polymer network comprising polydiorganosiloxane,
wherein the weight ratio of component (b) to component (a) is from 1/100 to about 20:80.

* * * * *